United States Patent
Boucard et al.

(10) Patent No.: US 8,788,737 B2
(45) Date of Patent: Jul. 22, 2014

(54) TRANSPORT OF PCI-ORDERED TRAFFIC OVER INDEPENDENT NETWORKS

(75) Inventors: Philippe Boucard, Le Chesnay (FR); Jean-Jacques Lecler, Cupertino, CA (US); Philippe Martin, La Colle-sur-Loup (FR); Laurent Moll, San Jose, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 263 days.

(21) Appl. No.: 13/337,280

(22) Filed: Dec. 26, 2011

(65) Prior Publication Data
US 2013/0166812 A1  Jun. 27, 2013

(51) Int. Cl.
G06F 13/36  (2006.01)
(52) U.S. Cl.
USPC .......................................................... 710/312
(58) Field of Classification Search
USPC .......................................................... 710/312
See application file for complete search history.

(56) References Cited

U.S. PATENT DOCUMENTS

| | | | |
|---|---|---|---|
| 6,044,207 A * | 3/2000 | Pecone et al. ................. | 710/314 |
| 6,418,494 B1 * | 7/2002 | Shatas et al. .................. | 710/305 |
| 6,725,297 B1 * | 4/2004 | Askar et al. ..................... | 710/52 |
| 7,412,555 B2 * | 8/2008 | Wang ............................. | 710/310 |
| 7,424,566 B2 * | 9/2008 | Manula et al. ................. | 710/310 |
| 7,634,610 B2 * | 12/2009 | Myers ............................ | 710/310 |
| 8,010,720 B2 * | 8/2011 | Iwaoka et al. .................. | 710/52 |
| 8,019,910 B2 * | 9/2011 | Brownell et al. ................ | 710/29 |
| 8,117,332 B2 * | 2/2012 | Riggert et al. ................ | 709/231 |
| 8,543,754 B2 * | 9/2013 | Glass et al. ................... | 710/311 |
| 8,570,916 B1 * | 10/2013 | Tang et al. .................... | 370/282 |
| 2001/0027505 A1 | 10/2001 | Rekeita et al. | |
| 2002/0194609 A1 * | 12/2002 | Tran ............................... | 725/95 |
| 2004/0019733 A1 * | 1/2004 | Garinger et al. ............... | 710/314 |
| 2004/0024949 A1 | 2/2004 | Winkler et al. | |
| 2004/0044821 A1 | 3/2004 | Myers | |
| 2005/0273400 A1 | 12/2005 | Blankenship et al. | |
| 2006/0031621 A1 | 2/2006 | Riley et al. | |
| 2006/0242352 A1 | 10/2006 | Torudbakken et al. | |
| 2007/0055828 A1 | 3/2007 | Tsien | |
| 2009/0037616 A1 * | 2/2009 | Brownell et al. ............... | 710/29 |
| 2009/0043940 A1 * | 2/2009 | Myers ............................ | 710/310 |
| 2010/0049886 A1 * | 2/2010 | Iwaoka et al. .................. | 710/52 |

OTHER PUBLICATIONS

International Search Report—PCT/US2012/071509—ISA/EPO—Apr. 5, 2013.

* cited by examiner

*Primary Examiner* — Paul R Myers
(74) *Attorney, Agent, or Firm* — Muncy, Geissler, Olds & Lowe, P.C.

(57) ABSTRACT

A system and method are disclosed for connecting PCI-ordered agents based on fully independent networks. The system and method are free of PCI topology constraints, so that the system and method can be implemented in an inexpensive and scalable way. The method disclosed is used to handle and transport PCI-ordered traffic on a fabric. Based on the actual ordering requirement of the set of PCI agents, the fabric includes two, three, or four independent networks.

28 Claims, 12 Drawing Sheets

| ROW PASS COLUMN? | PST | NP | CPL |
|---|---|---|---|
| PST | NO 511 | YES 512 | YES/NO 513 |
| NP | NO 521 | YES/NO 522 | YES/NO 523 |
| CPL | NO 531 | YES 532 | YES/NO 533 |

FIG.5

TRANSPORT OF PCI-ORDERED TRAFFIC OVER INDEPENDENT NETWORKS

FIELD

The present invention is related to computer systems and, more specifically, to inter-chip communication protocol.

BACKGROUND

Communication technologies that link multiple agents within or across integrated circuits are varied. A popular class of such technology is the PCI family, including the original PCI (Peripheral Component Interconnect), PCI-X, PCI-Express as well as the related HyperTransport and RapidIO. These technologies define protocols used for inter-chip communication. However, derivatives of these technologies are also used inside integrated circuits to link multiple agents. While there is no industry standard for these PCI-derived internal protocols, many companies used such protocols based on one or more of the PCI family technologies mentioned above.

Internal PCI-based protocols compete with a variety of other internal communication protocols including the AMBA (Advanced Microcontroller Bus Architecture) AXI (Advanced eXtensible Interface) and OCP (Open Core Protocol) standards. The PCI-based protocols differ from most of the other protocols in their ordering scheme and the constraints this scheme places on the behavior and topology of the fabric connecting the various agents. More specifically, fabrics supporting PCI ordering rely on three closely tied networks (Non-Posted, Completion, Posted) where specific inter-network ordering rules must be maintained. In addition, the topology of the fabric is constrained to be a tree. On the other hand, other protocols (like the aforementioned AXI and OCP) rely on independent networks where there is no ordering constraint between networks) and the fabric topology is not limited to a tree.

Because the use of PCI-family inter-chip protocols is pervasive, many agents (like switches, host bridges and host controllers for a variety of I/O protocols like Ethernet, USB, SATA) have been created to support the PCI-family protocols, and, more importantly, are based on PCI ordering. With progress in chip technology, many of these agents can be fitted on a single integrated circuit. To connect these agents inside the integrated circuit, the simplest method is to use an internal PCI-based protocol so that the agent can be reused without much modification. However, this means that the fabric required to connect these agents is complex and is costly to implement, especially when a large number of agents must be connected.

In prior art example of FIG. 1, a system 100 includes typical PCI-ordered agents 12 and a PCI-ordered fabric 14 connecting the agents 12. The PCI-ordered agents 12 connect through three networks: Non-posted 16a, Completion 16b, and Posted 16c. The Non-Posted (NP) network 16a is typically used to send read requests, but it may also carry less-common non-posted write requests and other types of requests. The Completion (CPL) network 16b is used to carry completion transactions corresponding to the requests placed on the NP network 16a. The Posted (PST) network 16c is typically used to send posted write requests, which do not require a completion, but it may also carry other types of requests like interrupt requests or messages.

The agents 12 have both inbound and outbound connections to the three networks, so there is a total of 6 ports for each agent 12. The agents 12 may have less than 6 ports if they don't need all types of transaction, for instance if they are master-only or slave-only. The 6 ports and the corresponding wires and ports in the fabric 14 may be partially or fully multiplexed on a set of physical wires. Each port may be implemented using more than one sub-port with separate flow control. Such an example would be to have separate command and data sub-ports with separate flow control. Depending on the connectivity of the fabric 14, each network may consist of one or more disconnected segments. In the example of FIG. 1, the fabric 14 allows full connectivity between all the agents, so each network is composed of a single segment. The fabric 14 can be implemented in many ways, including one or more cascaded switches. In the general case, its topology is a tree.

In some cases, the agents 12 have multiple copies of some of the ports, usually for quality-of-service or priority reasons. These copies may be physically independent, or multiplexed on a shared set of wires using independent flow control. In many PCI-family protocols, this is referred to as virtual channels.

Referring now to FIG. 2, a topology 20 is shown as another example. This topology includes a single 3-way switch 26, which is allowed for a PCI-ordered fabric, which connects three agents 22.

In some cases, PCI-ordered agents must be connected to a non-PCI ordered fabric. This is the case when an existing integrated circuit does not use a PCI-ordered fabric, but an agent that was originally created for a PCI-based fabric must be added. One common example is the addition of a PCI-Express root complex to an integrated circuit to support external PCI-Express agents. The PCI-Express root complex is naturally PCI ordered. Its connection to a non-PCI-ordered fabric can be done with a bridge. However, because of the difference in ordering requirements, the performance of this bridge may not be satisfactory. In addition, a number of deadlock cases may be introduced, especially if several such PCI-ordered clients are put on a non-PCI-ordered fabric and they are allowed to communicate with each other.

A prior art fabric 14 must enforce PCI ordering rules between the three networks (NP, CPL and PST). This requires the networks to be routed close to each other (or on the same wires) and then to use additional logic and buffering to keep track of the arrival order on the various networks and potentially buffer transactions when they may not progress through their network because of ordering constraints. This additional logic and buffering adds to the area and power of the fabric, increases the complexity of the fabric and potentially reduces the maximum clock frequency the fabric may run at. In addition, the topology of the fabric is usually limited to a tree, which may increase the total wire count and latency between agents. Therefore, what is needed is a system and method that overcome these problems by allowing the 3 networks to be handled independently in the fabric and making any topology possible.

SUMMARY

In accordance with the teaching of the present invention, a system and method are provided that describe a fabric that can connect PCI-ordered agents based on fully independent networks and does not have the PCI topology constraint, so that it can be implemented in an inexpensive and scalable way. The method disclosed is used to handle and transport PCI-ordered traffic on this fabric. Based on the actual ordering requirement of the set of PCI agents, this fabric may comprise 4, 3 or 2 independent networks.

In accordance with various aspects of the present invention, a non-PCI-ordered agent connects to a fabric and the disclosed invention handles and transports this traffic to make it interoperate with PCI-ordered traffic.

In accordance to various aspects of the present invention, a computer device is used to generate a fabric that can connect PCI-ordered and non-PCI ordered agents according to set requirements.

BRIEF DESCRIPTION OF DRAWINGS

FIG. 5 shows a table of rules in accordance with the teachings of the present invention.

DETAILED DESCRIPTION

Figure 1:
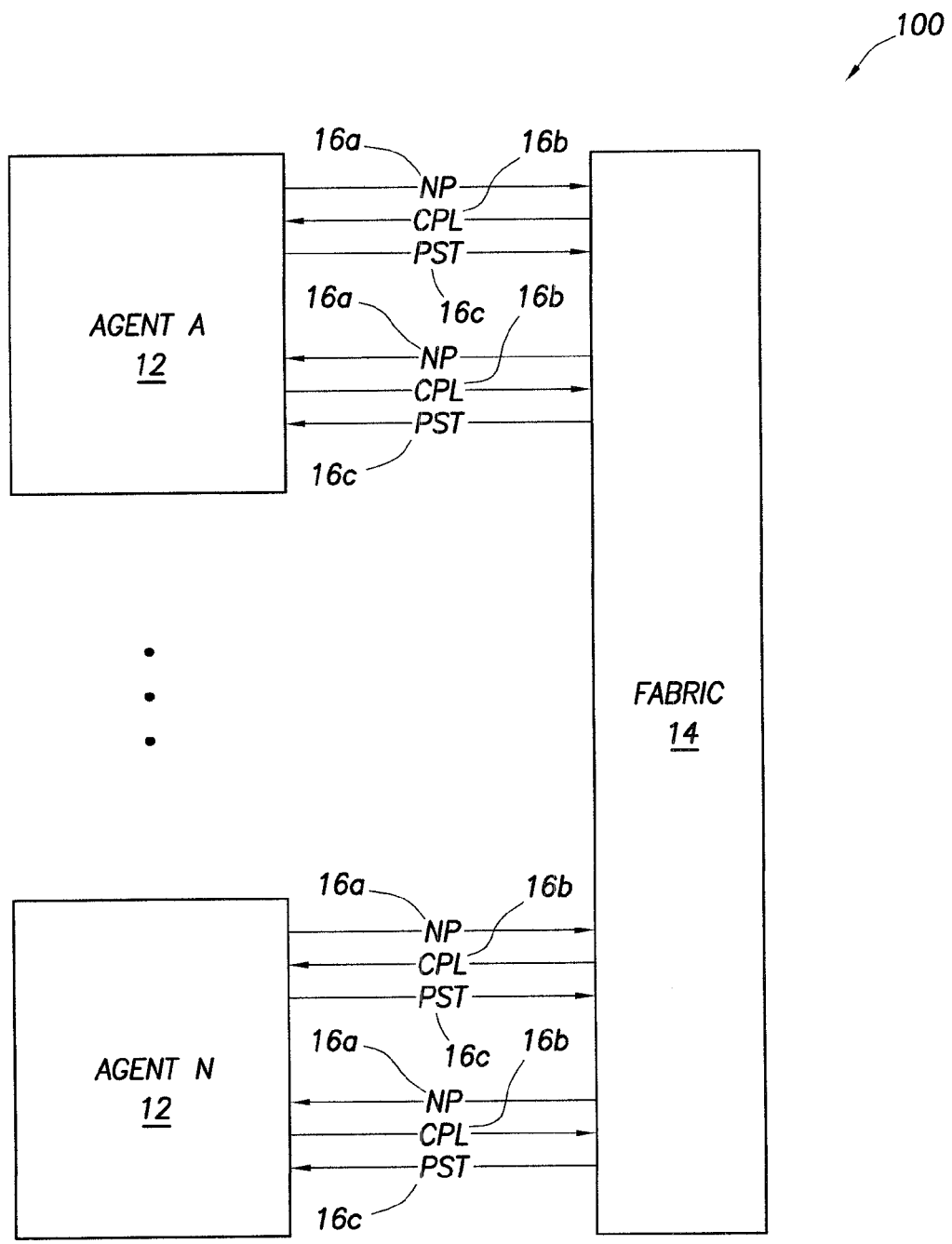
FIG. 1 shows a prior art PCI-ordered agents and a PCI-ordered fabric connecting the agents, where the fabric allows full connectivity between all agents.
Figure 2:
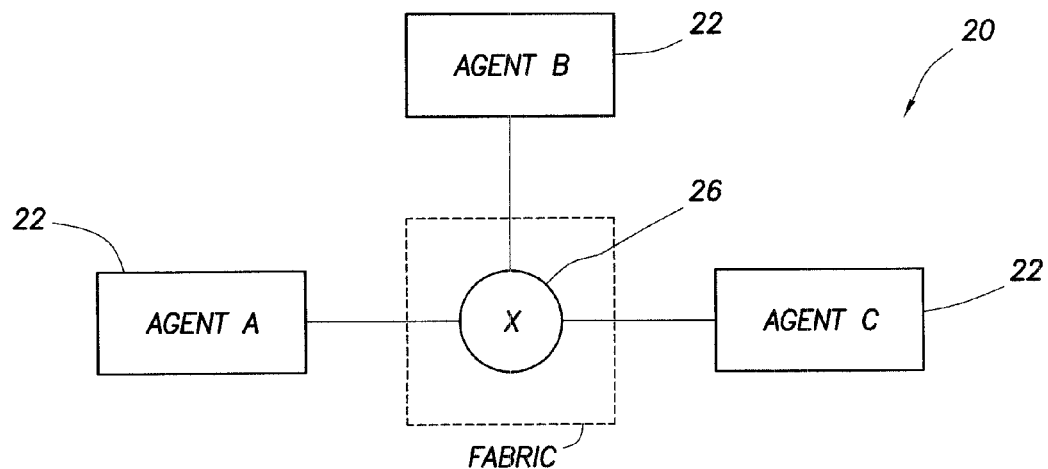
FIG. 2 shows a prior art topology composed of a single 3-way switch, which is allowed for a PCI-ordered fabric.
Figure 3:
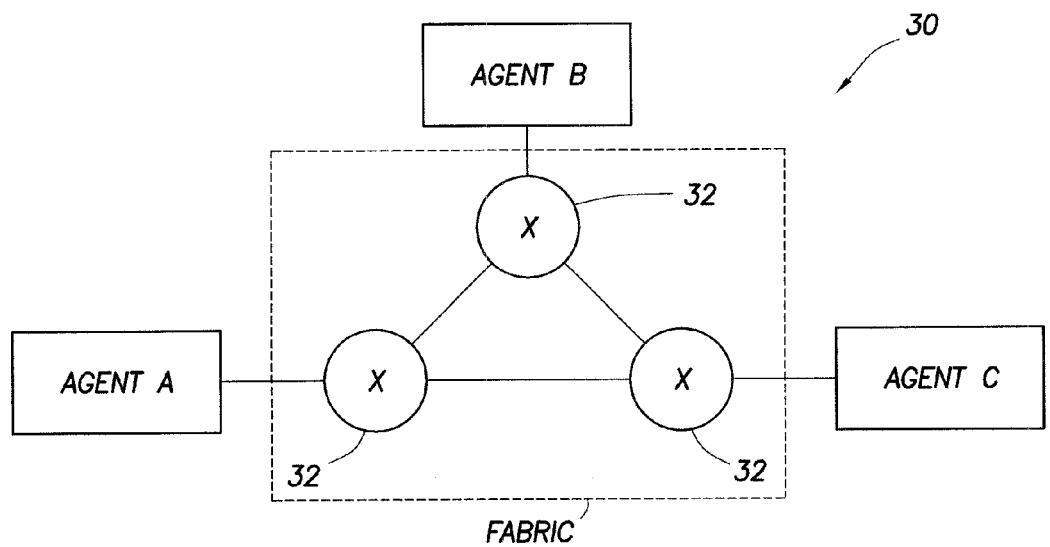
FIG. 3 shows a topology composed of 3 3-way switches, making the fabric 3 sets of pair-wise connections in accordance with the teachings of the present invention.

Referring now to FIG. 3, a topology 30 is shown that includes three 3-way switches 32, making the fabric 3 sets of pair-wise connections in accordance with the teachings of the present invention. The topology 30 is not permitted in a general-case PCI-ordered fabric and would not be supported by a prior-art system. As shown, there are multiple paths between any two agents.

Figure 4:
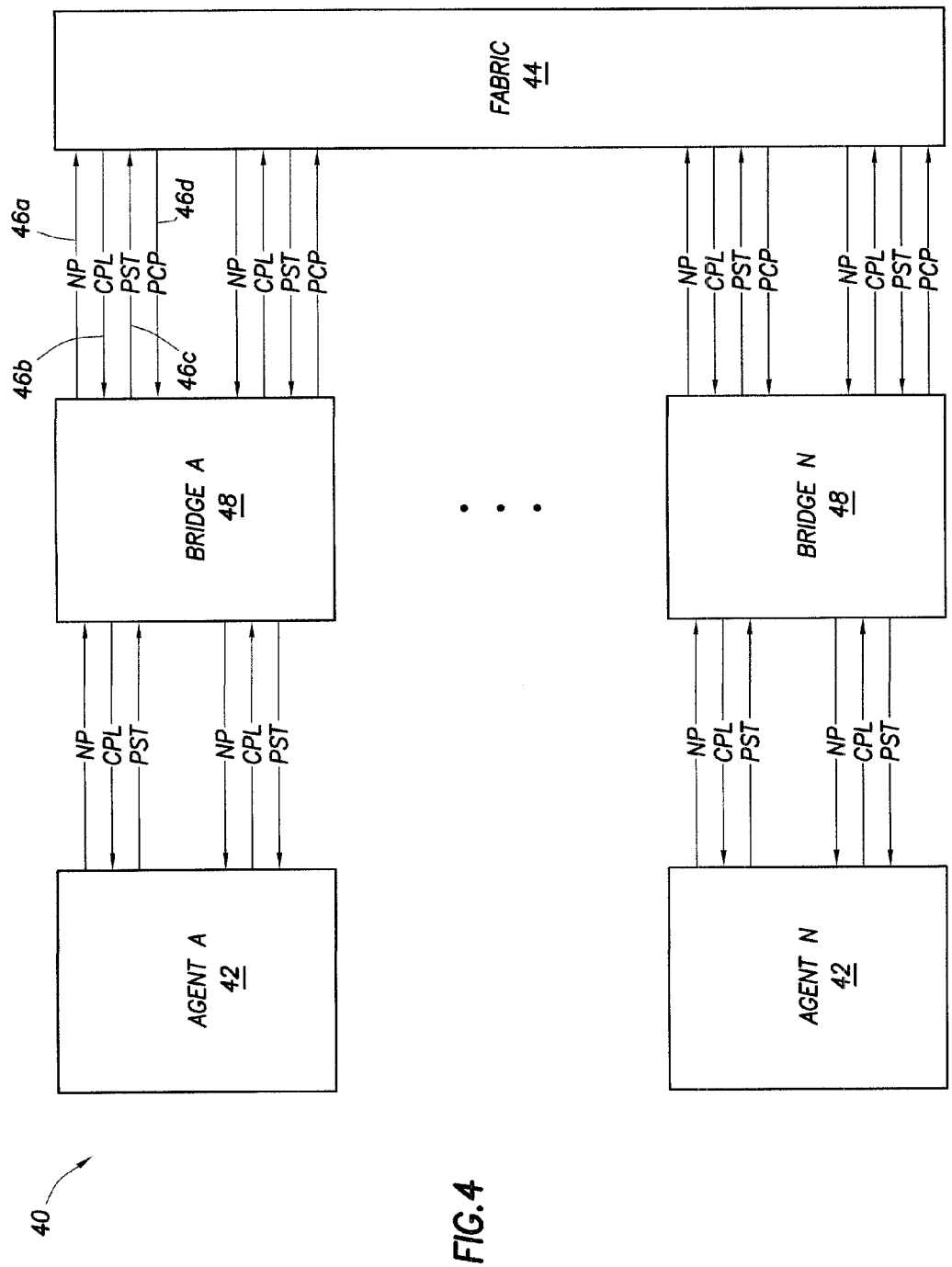
FIG. 4 shows agents connected to a fabric in accordance with the teachings of the present invention.

Referring now to FIG. 4 shows a system 40 with agents 42 connected to a fabric 44 in accordance with one aspect of the present invention. The system 40 includes four independent networks: Non-Posted 46a, Completion 46b, Posted 46c, Posted Completion 46d. At the edge of the fabric 44, a bridge 48 is used to connect the agents 42 to the fabric 44. The bridges 48 convert the PCI-ordered interface of the client to the new fabric. The bridges 48 have a 6-port interface on the agent side and an 8-port interface on the fabric side. In accordance with another aspect of the present invention, the bridges 48 may have a smaller number of ports if they don't need all types of transaction. For instance, if they are slave-only, they may only have NP and PST from the bridge 48 to the agent 42 and CPL from the agent 42 to the bridge 48 (3 ports total instead of 6) and NP and PST from the fabric 44 to the bridge 48 and CPL and PCP from the bridge 48 to the fabric 44 (4 total). The bridges 48 may or may not be identical. Although the bridges 48 provide the same general functionality, they may be customized to specific features of the agents, including, but not limited to, bus widths, clock and power controls and special ordering requirements.

In accordance with various aspects of the present invention, the eight ports on the bridge 48 and the corresponding wires and ports in the fabric 44 may be partially or fully multiplexed on a set of physical wires. In accordance with various aspects of the present invention, each of the 8 ports on the bridge 48 and in the fabric 44 may be implemented using more than one sub-port with separate flow controls. Such an example would be to have separate command and data sub-ports with separate flow control. In accordance with various aspects of the present invention, the agents 42 may use different PCI-ordered protocols than other agents 42. In accordance with various aspects of the present invention, the agents 42 have multiple copies of some of the ports, usually for quality-of-service or priority reasons. These copies may be physically independent, or multiplexed on a shared set of wires using independent flow control. In many PCI-family protocols, this is referred to as virtual channels. In this case, the various ports may be connected to multiple bridges, or the bridges may directly support the multiple copies. Thus, the bridges 48 provide support for the different protocols. In accordance with various aspects of the present invention, the bridges 48 are identical and support all protocols.

In accordance with various aspects of the present invention, the bridges 48 are different, each supporting only a subset of all protocols. The fabric 44 includes independent networks with no ordering required between them. Any topology is also possible. In accordance with various aspects of the present invention, this topology may be built out of a single 3-way switch. In accordance with various other aspects of the present invention, this topology may be built out of pair-wise connections as in FIG. 3. In accordance with various aspects of the present invention, some networks (NP, CPL, PST, PCP) may use a different topology than others.

Referring now to FIG. 5, an ordering table 500 is shown with multiple decision points or spot in the table that applies to PCI-ordered fabric. In accordance with various aspects of the present invention, there are many variants of the table 500 as supported by the various internal and external PCI-ordered protocol. In spot 511, a PST may not pass PST: this is a critical rule of all PCI-ordered protocols. While some protocols allow for request-by-request exceptions to this rule, it must still be generally enforced. In spot 512, a PST must pass NP: this rule is required to avoid deadlocks. In spot 513, a PST and CPL are considered: In many PCI-ordered protocols, PST may or may not pass CPL. In some protocols, PST must pass CPL to avoid deadlocks.

In spot 521a NP may not pass PST: this is another critical rule of all PCI-ordered protocols. While some protocols allow for request-by-request exceptions to this rule, it must still be generally enforced. In spot 522 NP and NP: While PCI ordering does not require NP to be kept in order, some PCI-ordered protocols require order to be kept. In spot 523 NP and CPL: NP may or may not pass CPL.

In spot 531 CPL may not pass PST: this is the third critical rule of all PCI-ordered protocols. While some protocols allow for request-by-request exceptions to this rule, it must still be generally enforced. In spot 532 CPL must pass NP: This rule is required to avoid deadlocks. In spot 533 CPL may or may not pass CPL: while PCI ordering does not require CPL to be kept in order, some PCI-ordered protocols do required it.

As seen above, the three critical rules have to do with the PST requests. None of PST, NP and CPL may pass previous PST going in the same direction except as allowed on a per-request basis. This is required to guarantee functional producer-consumer exchanges despite the fact that requests in PST do not have a response, and so cannot be tracked. In addition, both PST and CPL must be able to pass NP to avoid deadlocks, and in some cases PST must be able to pass CPL, also to avoid deadlocks. In accordance with various aspects of the present invention, the required ordering rules are considered to guarantee functional producer-consumer exchanges, while still meeting the deadlock requirements.

Figure 6:
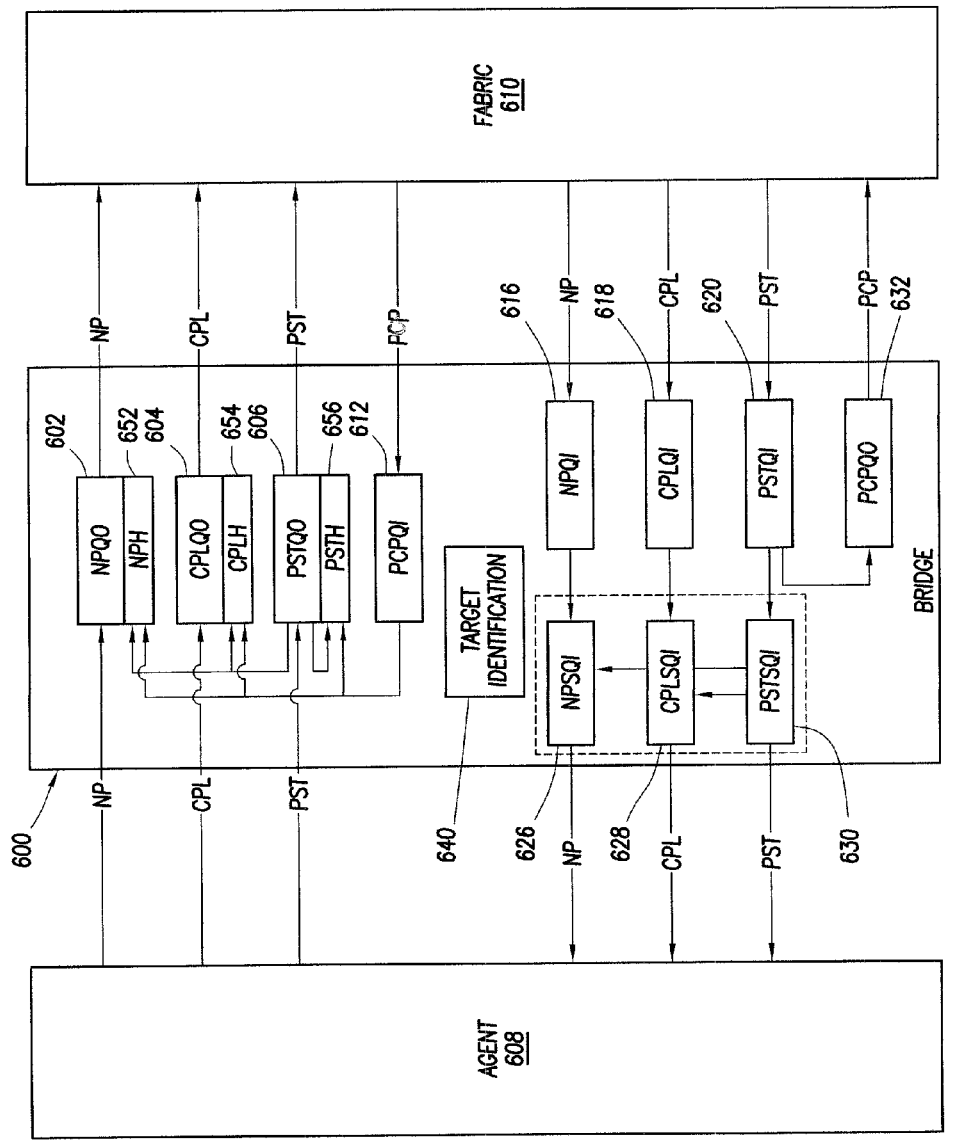
FIG. 6 shows a bridge located between an agent and a fabric, which is a four network system in accordance with the teachings of the present invention.

Referring now to FIG. 6, a bridge 600 is shown for converting the PCI-ordered protocol to the 4-independent-network protocol of a fabric 610. The bridge 600 has queues for outbound NP, a NP queue out (NPQO) 602; for outbound CPL, the CPL queue out (CPLQO) 604; and for the PST, the PST queue out (PSTQO) 606. These queues receive the NP, CPL and PST, respectively, from an agent 608 and later put them on the NP, CPL and PST ports of the fabric 610. The outbound queues of the bridge 600 may transform the transactions going through it to make them match the fabric protocol (e.g. split/merge, add/remove information, change tag).

In addition, the bridge 600 has an inbound PCP queue (PCPQI) 612, which corresponds to completions of PST requests sent on the fabric 610 of the PST network. The PCP completions are used internally by the bridge 600 to inform the hazard checking logic that a particular PST has completed.

The bridge 600 also has primary queues for inbound NP, the NP queue in (NPQI) 616; for inbound CPL, the CPL queue in (CPLQI) 618; and for the inbound PST, the PST queue in (PSTQI) 620. These queues get the NP, CPL and PST, respectively, from the fabric 610 and later put them on the NP, CPL and PST ports of the agent 608. The inbound queues of the bridge may transform the transactions going through it to make them match the agent protocol (e.g. split/merge, add/remove information, change tags . . . ). The bridge 600 has a set of secondary input queues NPSQI 626, CPLSQI 628, PSTSQI 630 that are in series with the primary NPQI 616, CPLQI 618, and PSTQI 620 (respectively), but also carry PCI ordering rules so that NP and CPL carry ordering dependencies on prior PST. This allows posted completions to be sent back to the fabric 610 as soon as posted requests are sent from the PSTQI 620 to the PSTSQI 630. The bridge 600 also has an outbound PCP queue (PCPQO) 632, which corresponds to completions of PST requests received from the fabric 610 PST network. The PCPQO enqueues a PCP completion once the corresponding PST request has been issued to the PSTSQI 630.

The bridge 600 also has target identification logic 640, which, for each transaction in the outbound queues, computes to which target in the fabric 610 the transaction must be delivered. In accordance with various aspects of the present invention, the target identification logic 640 relies on addresses in the transactions and an address table to compute the target. In accordance with various aspects of the present invention, the target identification logic 640 uses tags present in the transaction to compute the target.

Finally, for the NPQO 602, CPLQO 604 and PSTQO 606, the bridge 600 includes hazard checking logic, such as NPH 652, CPLH 654 and PSTH 656, respectively, each of which keep track of the arrival order of NP, CPL and PST, respectively, compared to PST transactions and the completion of those PST transactions, coming from the PCPQI 612. Based on the transaction characteristics and the presence and destination of prior PST requests that have not been sent to the fabric 610 or that have been sent to the fabric 610 but have not had a completion received in the PCPQI 612, the hazard checking logic may or may not allow a transaction to be sent immediately.

In accordance with various aspects of the present invention, the tracking of PST requests that have been sent from the PSTQO 606, but have not received a corresponded completion in the PCPQI 612, is done by keeping entries in the PSTQO 606 at least until they receive a completion. In accordance with various aspects of the present invention, the tracking of PST requests that have been sent from the PSTQO 606, but have not received a corresponded completion in the PCPQI 612, is done through logic external to the PSTQO 606. In accordance with various aspects of the present invention, the tracking of PST requests that have been sent from the PSTQO 606, but have not received a corresponded completion in the PCPQI 612, is done through logic in one or more of the hazard checking logic blocks PSTH 656, NPH 652, and CPLH 654. In accordance with various aspects of the present invention, one or more of the queues may be of size 0, although their functionality remains the same. In accordance with various aspects of the present invention, some or all secondary input queues NPSQI 626, CPLSQI 628, and PSTSQI 630 may not present. Additionally, in accordance with various aspects of the present invention, some or all primary input queues NPQI 616, CPLQI 618, and PSTQI 620 are not present.

In accordance with various aspects of the present invention, to accelerate the return of outbound PCP, the size of the PSTQI 620 is reduced or the PSTQI 620 is eliminated.

In accordance with one aspect of the present invention, the NPQO 602 is sized in proportion to the round-trip latency of PST requests to PCP completions across the fabric 610. This is done to reduce the bandwidth and latency impact of the ordering delay occurred by NP requests because of non-completed earlier PST requests. If the NPQO 602 is small in relation to the round-trip latency of PST requests, then earlier PST requests that have not completed on the fabric 610 can delay enough NPQ requests in the NPQO 602 because of ordering requirements to cause back-pressure of the NPQO 602 into the agent 608. This in turn can cause more PST requests to come from the agent 608 into the PSTQO 606. While these "more PST" requests might have been considered younger than some of the back-pressured NP requests that the agent 608 was trying to send, the NPH 652 will not see the back-pressured NP requests until later, so the PST requests may arrive earlier in the bridge 600 and be considered as older than the NP requests when they arrive, causing them further delay. If the NPQO 602 is sized to cover the full roundtrip of PST requests through the fabric 610, then NP requests in the NPQO 602 will still stall waiting for earlier PST requests to complete. However, further NP requests will be allowed to enter the NPQO 602. This way, these requests will only be ordered behind PST requests that were really transmitted older. This allows the bandwidth penalty due to the delay of NP request because of ordering behind PST requests to be reduced or eliminated. The latency penalty will also reduce.

In accordance with one aspect of the present invention, the CPLQO 604 is sized in proportion to the round-trip latency of PST requests to PCP completions across the fabric 610. This is done to reduce the bandwidth and latency impact of the ordering delay occurred by CPL completions because of non-completed earlier PST requests.

Figure 7:
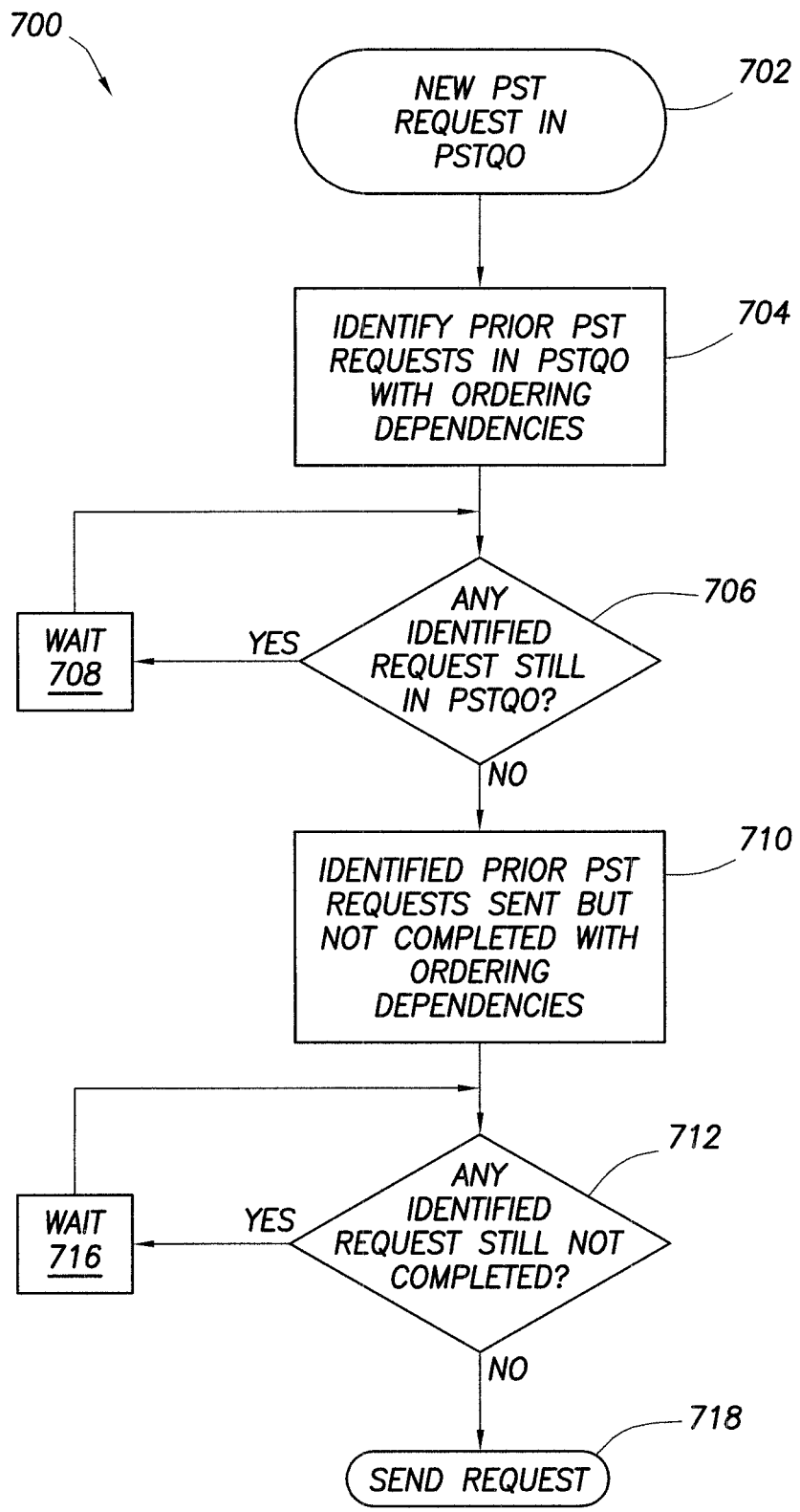
FIG. 7 shows a flow process for new PST requests in accordance with the teachings of the present invention.

Referring now to FIG. 7, a process decision diagram 700 is used by the posted hazard checking logic, such as PSTH 656 of FIG. 6. The PST hazard checking logic PSTH 656 makes sure that ordered PST requests become visible in a global order corresponding to their arrival order in the PSTQO 606 of FIG. 6. At step 702, the new PST request arrives from the agent. At step 704, the PSTH 656 identifies all the prior PST requests in the PSTQO 606 upon which the new request has an ordering dependency. In accordance with one aspect of the present invention, the new PST request has an ordering dependency on all prior PST requests. In accordance with another aspect of the present invention, PST requests contain an individual flag indicating if they have an ordering dependency on all or none or some prior PST requests. In accordance with various aspects of the present invention, PST requests contain an individual tag; they have an ordering dependency only on prior not completed PST requests that have the same tag. At step 706, the PSTH 656 determines if there are any prior PST requests identified in step 1 to be sent out of the PSTQO 606. If yes, then at step 708, the new PST request waits for all prior PST requests identified in steps 702 and 704 to be sent out of the PSTQO 606. In accordance with various aspects of the present invention, step 706 is done by waiting until the new PST request reaches the front of the PSTQO 606. If no is determined at step 706, then the process moves to step 710.

At step 710, the PSTH 656 identifies all the sent but not completed (i.e. have not received a corresponding completion in the PCPQI 612) prior PST requests upon which the new request has an ordering dependency. In accordance with one aspect of the present invention, the new PST request may only have an ordering dependency on a prior PST request to a different target (as computed by the target identification logic). In accordance with another aspect of the present invention, the new PST request has an ordering dependency on all prior PST requests. In accordance with various aspects of the present invention, PST requests contain an individual flag indicating if they have an ordering dependency on all or none or some prior PST requests. In accordance with various aspects of the present invention, PST requests contain an individual tag where they have an ordering dependency only on prior not completed PST requests that have the same tag. Thus, the scope of the present invention is not limited by the dependency protocol.

At step 712, the process determines if all prior PST requests identified in step 710 to complete. If yes, then the process moves to step 716 and the new PST request waits. In accordance with another aspect of the present invention, there may be "sent but non-completed" PST requests to only a single target at a time. Thus, step 710 is done by having the new PST request wait at step 716 until the current single target is the same as its own target or there are no "sent but not completed" PST requests. If no at step 712, then the process moves to step 718, and the new PST request can be sent out of the PSTQO 606.

In accordance with various aspects of the present invention, the identification steps 704 and 710 are done concurrently. In accordance with various aspects of the present invention, the waiting loops 706/708 and 712/716 are done concurrently.

Figure 8:
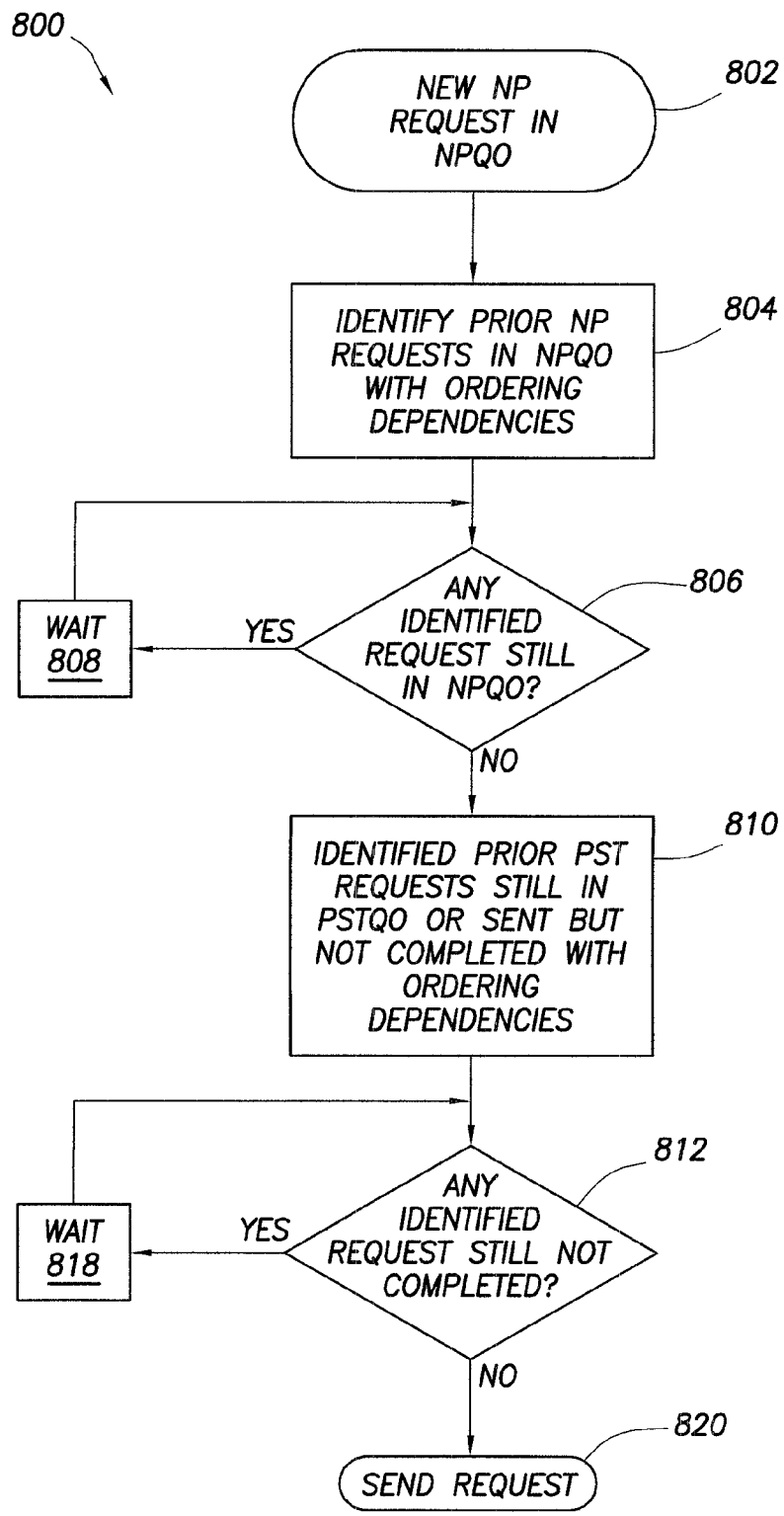
FIG. 8 shows a flow process for new NP responses in accordance with the teachings of the present invention.

Referring now to FIG. 8, a process decision diagram 800 is used by the non-posted hazard logic NPH, such as NPH 652 of FIG. 6. The NP hazard checking logic NPH 652 makes sure that ordered PST requests become visible before sending NP requests in the fabric and that the NP requests are sent in the appropriate order with respect to prior ordered NP requests. At step 802, new NP requests arrive in the NPQO 602. At step 804, when the new NP request arrives from the agent, the NPH 652 identifies all the prior NP requests in the NPQO 602 upon which the new request has an ordering dependency. In accordance with one aspect of the present invention, the new NP request has an ordering dependency on all prior NP requests. In accordance with another aspect of the present invention, NP requests contains an individual flag indicating if they have an ordering dependency on all or none or some prior NP requests. In accordance with various aspects of the present invention, NP requests contain an individual tag and have an ordering dependency only on prior not completed NP requests that have the same tag. In accordance with various aspects of the present invention, the new NP request never has an ordering dependency on prior NP requests.

At step 806, the process 800 determines if any prior NP requests identified in step 804 are waiting to be sent out of the NPQO 602. If yes, then at the new NP request waits at step 808 for all prior NP requests identified in step 804 to be sent out of the NPQO 602. In accordance with various aspects of the present invention, the step 808 is done by waiting until the new NP request reaches the front of the NPQO 602.

At step 810, the NPH 652 identifies all the prior PST requests upon which the new NP request has an ordering dependency and still in the PSTQO 606 or have been sent but have not completed. In accordance with one aspect of the present invention, for select targets (e.g. with memory semantics, like DRAMs or SRAMs), the new NP request may only have an ordering dependency on a prior PST request to the same address or address range or overlapping address range. In accordance with another aspect of the present invention, the new NP request has an ordering dependency on all prior PST requests. In accordance with yet another aspect of the present invention, the new NP request has an ordering dependency on all prior sent PST requests to different targets. In accordance with various aspects of the present invention, NP requests contain an individual flag indicating if they have an ordering dependency on all or none or some prior PST requests. In accordance with various aspects of the present invention, NP requests contain an individual tag where they have an ordering dependency only on prior not completed PST requests that have the same tag.

At step 812, the process 800 determines if there are any prior PST requests from step 810 to be completed. If yes, then the new NP request waits at step 818 for all prior PST requests identified in step 810 to complete. If no, then at step 820 the new NP request can be sent out of the NPQO 602.

In accordance with various aspects of the present invention, the identification steps 804 and 810 are done concurrently. In accordance with various aspects of the present invention, the waiting loops 806/808 and 812/818 are done concurrently.

Figure 9:
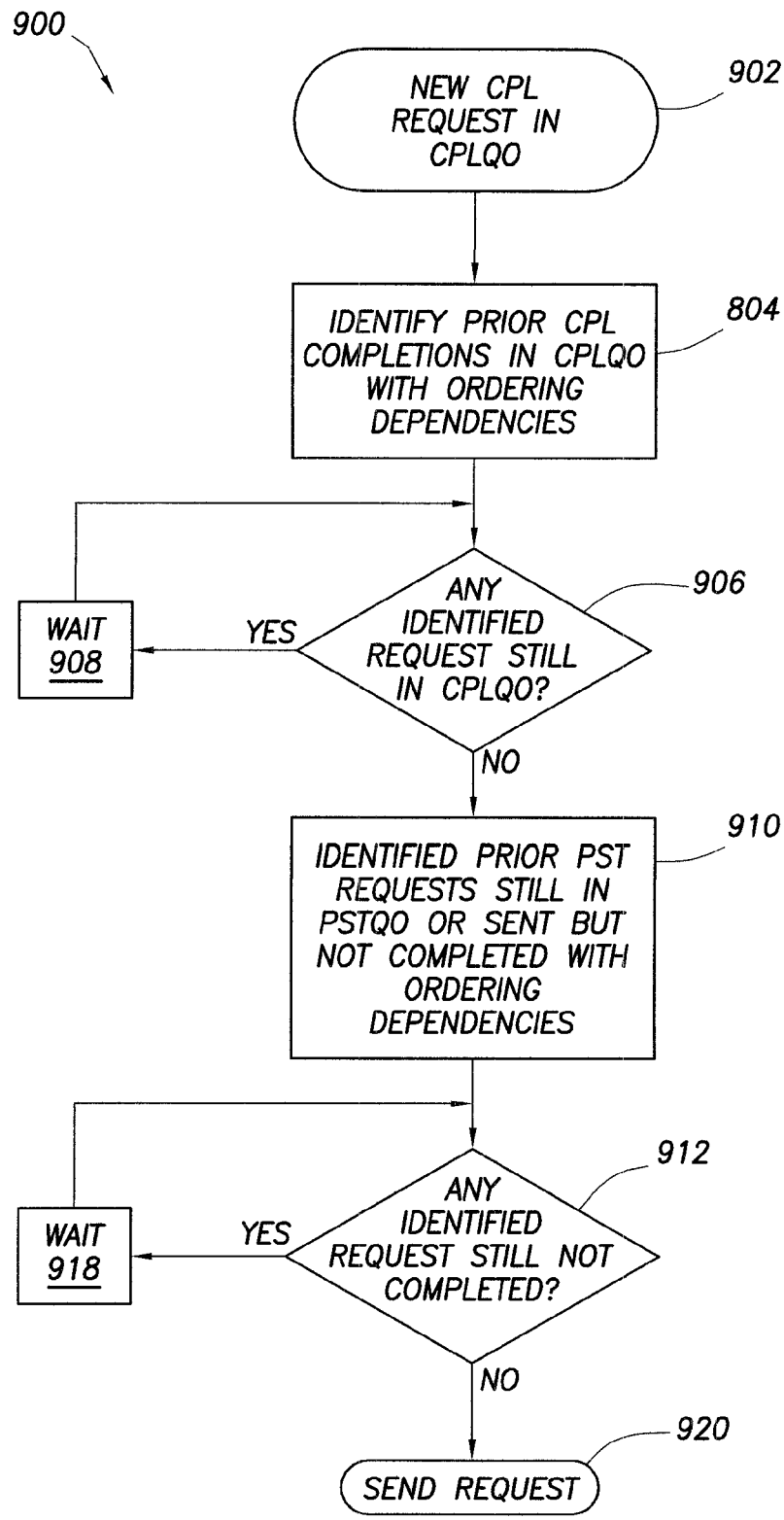
FIG. 9 shows a flow process for new CPL requests in accordance with the teachings of the present invention.

Referring now to FIG. 9, a process decision diagram 900 used by the completion hazard logic CPLH 654 is shown. At step 902 new CPL completions are in the CPLQO 604. The CPL hazard checking logic CPLH 654 makes sure that ordered PST requests become visible before sending CPL completions in the fabric and that CPL completions are sent in the appropriate order with respect to prior ordered CPL completions.

At step 904, when the new CPL completion arrives from the agent, the CPLH 654 identifies all the prior CPL completions in the CPLQO 604 that the new completion has an ordering dependency on. In accordance with one aspect of the present invention, the new CPL completion has an ordering dependency on all prior CPL completions. In accordance with another aspect of the present invention, CPL completions contain an individual flag indicating if they have an ordering dependency on all or none or some prior CPL completions. In accordance with various aspects of the present invention, CPL completions contain an individual tag and have an ordering dependency only on prior not completed CPL completions that have the same tag. In accordance with various another aspect of the present invention, the new CPL completion never has an ordering dependency on prior CPL completions.

At step 906, the process 900 determines if any prior CPL completions are waiting to be send out of the CPLQO 604. If yes, then the new CPL completion waits at step 908 for all prior CPL completions identified in step 1 to be sent out of the CPLQO 604. If no, then the process continues to step 910. In accordance with various aspects of the present invention, the second step is done by waiting until the new CPL completion reaches the front of the CPLQO 604.

At step 910, the CPLH 654 identifies all the prior PST requests that the new CPL completion has an ordering dependency on and are either still in the PSTQO 606 or have been sent but have not completed. In accordance with some aspects of the present invention, for select bridges (e.g. connected to the CPU/DRAM host bridge), the new CPL completion never has an ordering dependency on prior PST requests. In accordance with another aspect of the present invention, the new CPL completion has an ordering dependency on all prior PST requests. In accordance with various aspects of the present invention, CPL completions contain an individual flag indicating if they have an ordering dependency on all or none or some prior PST requests. In accordance with various aspects of the present invention, CPL completions contain an individual tag where they have an ordering dependency only on prior not completed PST requests that have the same tag.

At step 912, the process 900 determines if prior PST requests from step 910 are waiting to be completed. If yes, then the new CPL completion waits at step 908 for all prior PST requests identified in step 910 to complete. If no at step 912, then the new CPL completions can be sent out of the CPLQO 604.

In accordance with various aspects of the present invention, the identification steps 904 and 910 are done concurrently. In accordance with various aspects of the present invention, the waiting loops 906/908 and 912/918 are done concurrently.

Figure 10:
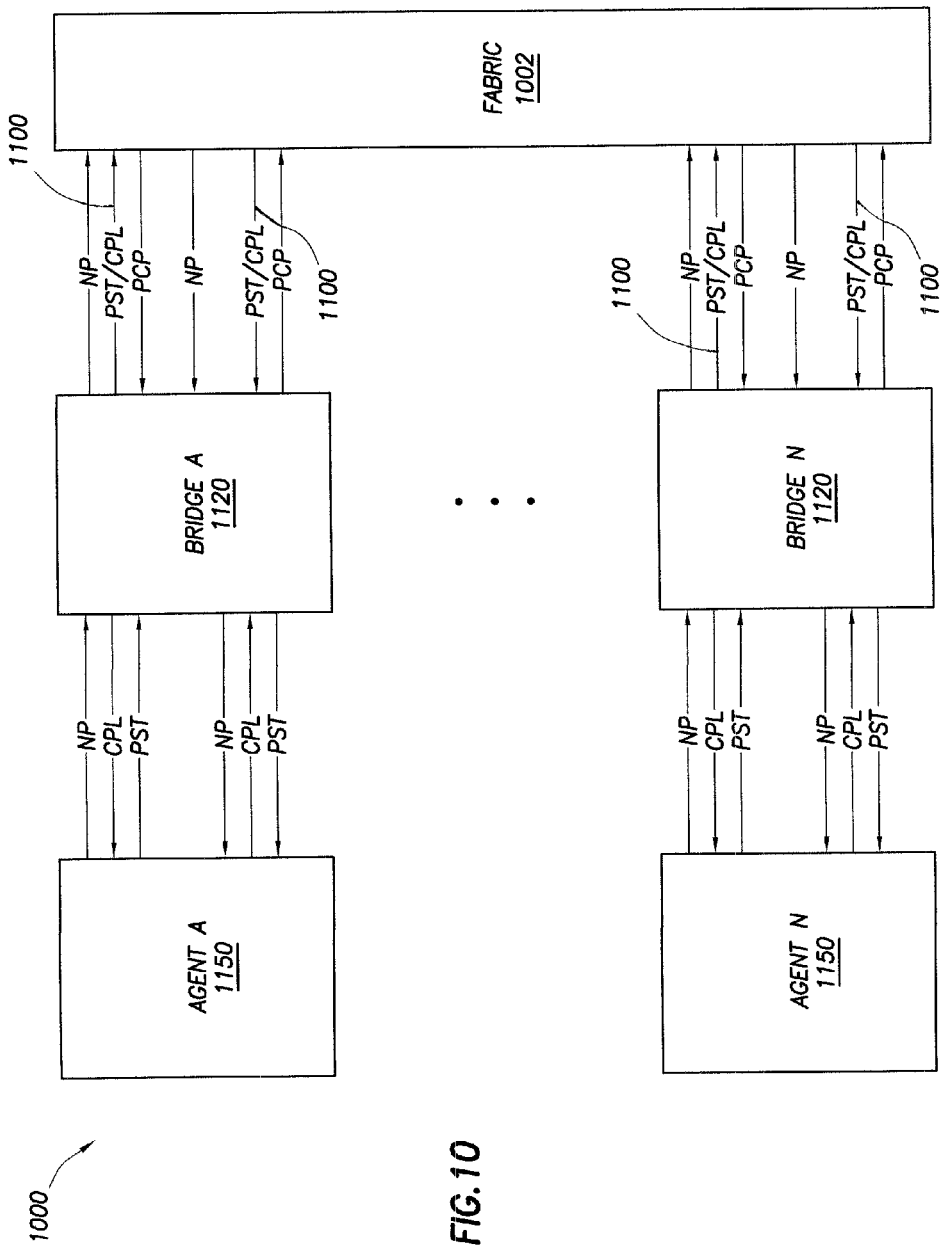
FIG. 10 shows agents connected to a fabric in accordance with the teachings of the present invention.

Referring now to FIG. 10, a system 1000 includes a fabric 1002 that uses three networks, carrying PST and CPL on the same network, with common flow control for the combined PST/CPL network 1100. Depending on the PCI-ordered protocols, at least one bridge 1120 needs to interface to and know the nature of the agents 1150. In some aspects of the present invention, the 3-network fabric 1002 may need to be replaced by the 4-network fabric 44 of FIG. 4 to avoid potential deadlocks. In particular, the 3-network fabric 1002 requires one or more agents to guarantee that CPL completions going to an agent 1150 drain with no dependency on the agent 1150 being capable of sending requests or completions to the fabric 1002.

In accordance with various aspects of the present invention, the sharing of networks is achieved by using the bridge described in FIG. 6 and adding a simple arbiter (not shown) between the output of the PSTQO 606 and CPLQO 604 to drive the combined PST/CPL output port. On the input side, the PST/CPL combined traffic is distributed to either the PSTQI 620 or the CPLQO 604 based on the transaction type. The flow control is the combination of the flow control of the two queues.

In accordance with various aspects of the present invention, the sharing of networks is achieved by using the bridge described in FIG. 6 is used to combine the PSTQO 606 and CPLQO 604 and, separately, the PSTQI 620 and CPLQI 618. The combined PSTQO 606/CPLQO 604 has an arbiter between the two input ports from the agent 1150 to arbiter between PST and CPL transactions. On the input side, the combined PSTQI 620/CPLQI 618 sends its transactions to the PST or CPL ports going to the agent based on the transaction type. The flow control from the PST and CPL ports from the agents is combined.

In accordance with various aspects of the present invention, the agent itself has combined some or all ports already combined. This is supported by using the bridge described in FIG. 6 and combining the corresponding queues as described in the previous embodiment.

In one embodiment, the hazard checking done in the CPLH 654 logic in FIG. 6 and shown in FIG. 6 may be optimized to not have a new CPL completion wait on a prior PST request that has not been completed when the new CPL completion and the prior PST request are to the same target.

Figure 11:
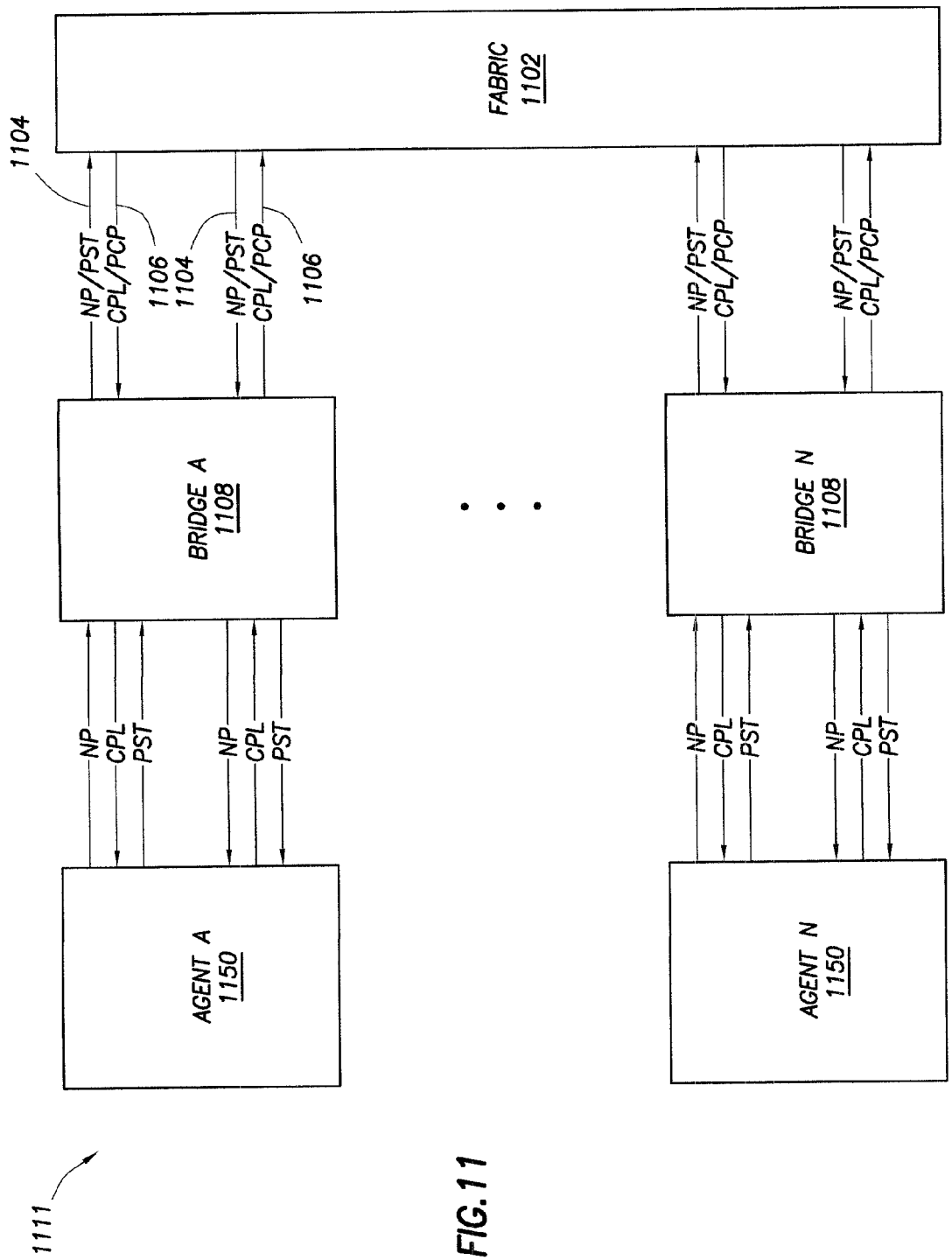
FIG. 11 shows agents connected to a fabric in accordance with the teachings of the present invention.

Referring now to FIG. 11, a system 1111 includes a fabric 1102 that includes two networks, carrying NP and PST on network 1104 (the NP/PST network, or request network) and carrying CPL and PCP on network 1106 (the CPL/PCP or response network). Depending on the PCI-ordered protocols bridges 1108 need to interface to and the nature of the agents 1150, this 2-network fabric 1102 may be replaced with a 4-network fabric 44 as shown in FIG. 4 or a 3-network fabric 1002 as shown in FIG. 10. In accordance with the teachings of the present invention, the alternative aspect related to the alternative network embodiments are used to avoid potential deadlocks. In particular, the 2-network fabric 1102 requires one or more agents 1150 to guarantee it does not order its CPL completions behind any PST request in the agent 1150 to fabric 1102 direction. While this violates the basic rule "CPL may not pass PST" 531 as shown in table of FIG. 5, it is commonly used in systems, in particular in the "downstream" direction, i.e. memory system agent to device agents.

In accordance with various aspects of the present invention, the sharing of networks is achieved by using the bridge 600 described in FIG. 6, and adding simple arbiters between the output of the NPQO 602 and PSTQO 606 to drive the combined NP/PST output and between the output of the CPLQO 604 and PCPQO 632 to drive the combined CPL/PCP output. On the input side, the NP/PST combined traffic is distributed to either the NPQI 616 or the PSTQI 620 based on the transaction type and the CPL/PCP combined traffic is distributed to either the CPLQI 618 or the PCPQI 612 based on the transaction type. The flow control is the combination of the flow control of the two queues.

In accordance with various aspects of the present invention, the sharing of networks is achieved by using the bridge 600 described in FIG. 6 and combining the NPQO 602 and PSTQO 606, the CPLQO 604 and PCPQO 632, the NPQI 616 and PSTQI 620, the CPLQI 618 and PCPQI 612. The combined output queues have an arbiter between the two input ports from the agent 1150. On the input side, the combined input queues send the transactions to the ports going to the agent 1150 based on the transaction type. The flow control from the agents is combined.

In accordance with various aspects of the present invention, the agent 1150 itself has combined some or all ports already combined. This is supported by using the bridge 600 of FIG. 6 and combining the corresponding (PST and NP) queues as described in accordance with the present invention.

According to the various aspects of the present invention, the hazard checking done in the NPH 652 logic in FIG. 6 and shown in FIG. 7 may be optimized to prevent having a new NP request wait on a prior PST request that has not been completed when the new NP request and the prior PST request are to the same target.

Figure 12:
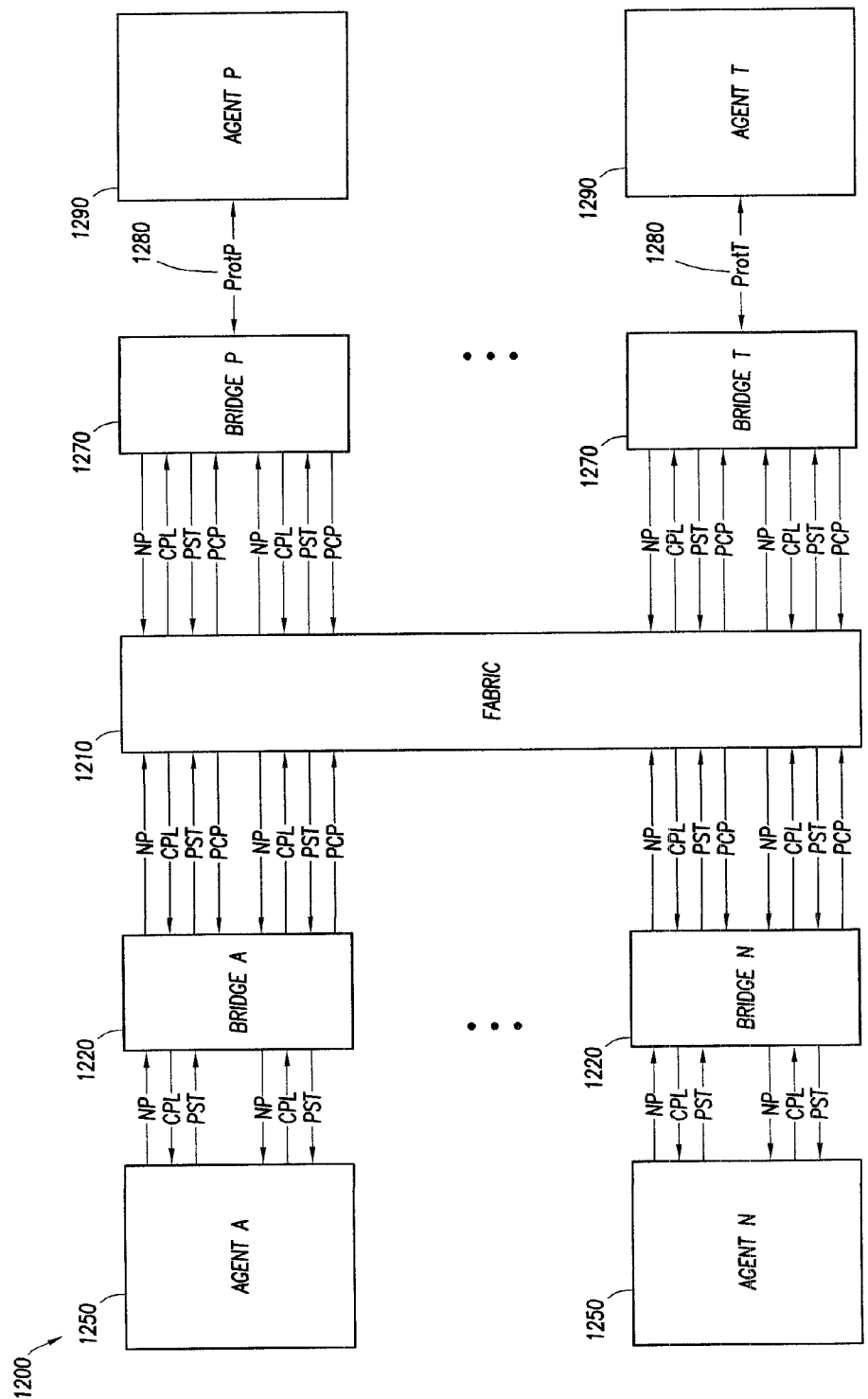
FIG. 12 shows PCI and non-PCI ordered agents connected to a fabric in accordance with the teachings of the present invention.

Referring now to FIG. 12, a system 1200 includes PCI-ordered agents 1250 connected to a fabric 1210 through bridges 1220. In addition, non-PCI ordered agents 1290 are connected to the fabric 1210 through bridges 1270. On their secondary side or the fabric side, which is toward the fabric 1210, the bridges 1270 have the same ports as the bridges 1220. On their primary side, which is toward the agents 1290, the bridges 1270 support a non-PCI-ordered protocol over the link 1280. In accordance with various aspects of the present invention, the non-PCI-ordered protocols over the link 1280 may be different. Examples of such protocols of link 1280 include AMBA (AXI, AHB, APB) and OCP. These protocols generally have reads and read responses, writes, and for some, write responses. The link 1280 is generally composed of several sublinks, e.g. one master link and one slave link. Reads and writes may also have separate links. The protocol conversion by the bridges 1270 may include a number of steps including splitting and merging, adding or removing side information or remapping tags.

According to one aspect of the present invention, read requests on the link 1280 from the from agents 1290 are mapped by the bridges 1270 to read requests on the fabric 1210 NP network and the corresponding read completions on the fabric 1210 CPL network are mapped by the bridges 1270 to read responses on the link 1280. According to one aspect of the present invention, read requests on the fabric 1210 NP network targeting the agents 1290 are mapped by the bridges 1270 to read requests on the link 1280 and the corresponding read responses on the link 1280 are mapped by the bridges 1270 to completions on the fabric 1210 CPL network.

According to another aspect of the present invention, write requests on the link 1280 from agents 1290 may be mapped by the bridges 1270 to non-posted writes on the NP network of the fabric 1210. According to one aspect of the present invention, if the protocol of link 1280 requires a response to some or all write requests, that response may be generated by mapping in the bridges 1270 the corresponding write completion from the fabric 1210 CPL network to a write response on the link 1280.

According to another aspect of the present invention, if the protocol of link 1280 requires a response to some or all write requests, that response may be generated directly by the bridges 1270 and the corresponding write completion from the fabric 1210 CPL network may not be transmitted on the link 1280.

According to another aspect of the present invention, write requests on the link 1280 from agents 1290 may be mapped by the bridges 1270 to posted writes on the PST network of the fabric 1210. According to one aspect of the present invention, if the protocol of link 1280 requires a response to some or all write requests, that response may be generated in the bridges 1270 by mapping the corresponding posted write completion from the fabric 1210 PCP network to a write response on the link 1280. According to another aspect of the present invention, if the protocol of link 1280 requires a response to some or all write requests, that response may be generated directly by the bridges 1270 and the corresponding posted write completion from the fabric 1210 PCP network may not be transmitted on the link 1280.

According to another aspect of the invention, posted write requests from the fabric 1210 PST network targeting the agents 1290 are mapped by the bridges 1270 to writes on the link 1280. According to one aspect of the present invention, the corresponding posted completion to be sent on the fabric 1210 PCP network is directly generated by the bridges 1270. According to another aspect of the present invention, the corresponding posted completion to be sent on the fabric 1210 PCP network is generated by mapping the write response from link 1280 to the posted completion, if the link 1280 provides such a write response.

According to another aspect of the invention, non-posted write requests from the fabric 1210 NP network targeting the agents 1290 are mapped by the bridges 1270 to writes on the link 1280. According to one aspect of the present invention, the corresponding non-posted completion to be sent on the fabric 1210 CPL network is directly generated by the bridges 1270. According to another aspect of the present invention, the corresponding non-posted completion to be sent on the fabric 1210 CPL network is generated by mapping the write response from link 1280 to the non-posted completion, if the link 1280 provides such a write response.

Figure 13:
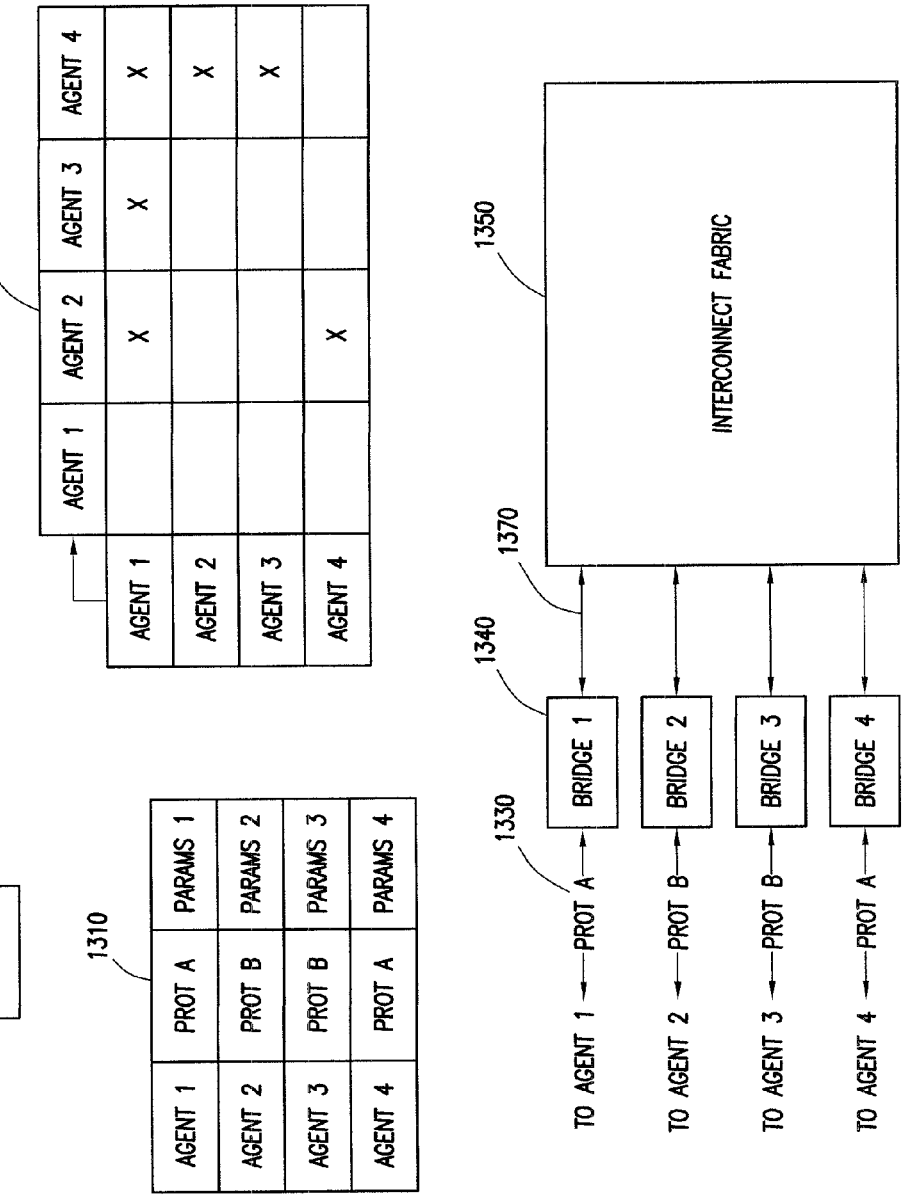
FIG. 13 shows the process of taking a specification of a PCI-ordered system and creating a corresponding system using the fabric described in FIG. 4.

Referring now to FIG. 13, a computer that includes a processor and a memory executes a program used to generate models of a PCI-ordered interconnect fabric 1350 based on user inputs. According to various aspects of the present invention, these models may include simulation models, performance models, functional models and synthesizable models.

A list of PCI-ordered protocols list 1360 supported by the program is presented to the user. While only two protocols are shown as PROT A and PROT B, the scope of the present invention is not limited by the number of protocols. As seen in visual presentation of table 1310, the user enters a number of agents that must be connected to the interconnect fabric. For each agent, the user picks the PCI-ordered protocol from the protocol list 1360 that must be used to connect to the agent. The user also picks the parameters for this protocol, such as PARAMS 1, PRAMAS 2, PARAMS 3, PARAMS 4 of table 1310. The relationships and rules are kept in the table 1310, where for each agent, the corresponding PCI-ordered protocol and parameters are stored. According to one aspect of the present invention, the parameters include the number of ports and widths of each port. According to one aspect of the present invention, the parameters include the type and format of the transactions supported. According to another aspect of the present invention, the parameters include the ordering requirements for the various types of transactions supported.

The table 1310 is used by the program to simulate or generate a bridge 1340 for each agent that is enabled to connect to the agent on the primary interface of the bridge through link 1330 using the protocol and parameters in table 1310. The bridge 1340 also has a secondary interface connected to the fabric 1350 through link 1370. According to the one aspect of the present invention, the secondary interface is enabled to send the various types of traffic (e.g. Non-Posted, Completions, Posted) on independent networks. According to one aspect of the present invention, the bridge 1340 generates a posted completion on its secondary interface when it receives a posted request. According to one aspect of the invention, the bridge 1340 is enabled to delay the issuance on the secondary interface of requests and completions received from the agent on its primary interface based on the receipt of a posted completion from the fabric 1350 as a response to the previous issuance by the bridge 1340 of a posted request on its secondary interface.

According to one aspect of the present invention, the user inputs a connectivity table 1320, which is used by the program to generate models of the fabric 1350 that matches the connectivity requirements from table 1320. According to other aspects of the invention, the user inputs a more detailed description of the interconnect fabric 1350 based on a set of pre-defined elements, which is used by the program to generate models of the interconnect that matches the detailed description.

It is to be understood that the present invention is not limited to particular embodiments or aspects described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which the present invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Although the foregoing invention has been described in some detail by way of illustration and example for purposes of clarity of understanding, it is readily apparent to those of ordinary skill in the art in light of the teachings of the present invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A system for simplification of interconnecting a fabric using a plurality of networks, the system comprising:
    at least one PCI-ordered agent, wherein the at least one PCI-ordered agent includes an interface to transmit and receive at least one transaction type selected from a transaction group, wherein the transaction group includes posted, non-posted, and completion;
    a first bridge, wherein the first bridge comprises:
        a primary interface in communication with the at least one PCI-ordered agent to transmit and receive the at least one transaction type selected from the transaction group; and
        a secondary interface to transmit and receive at least one secondary transaction type selected from a secondary transaction group that includes posted, non-posted, completion and posted completion,
        wherein the posted completion from the secondary transaction group is transmitted by the first bridge on the secondary interface in response to reception of the posted from the transaction group; and
    an interconnect fabric communicating with the secondary interface and enabled to transport transactions between the first bridge and a second bridge, wherein fabric ordering is independent of transaction ordering, and
    wherein the first bridge and the second bridge include hazard logic enabled to delay a transmission of a transaction selected from the transaction group based on a reception of posted completion from the secondary transaction group corresponding to previously transmitted posted from the transaction group.

2. The system of claim 1 wherein the hazard logic is configured to not delay the transmission of posted from the transaction group based on previously transmitted posted from the secondary transaction group transmitted by the interconnect fabric to the same bridge as the posted from the transaction group is transmitted to by the at least one PCI-ordered agent.

3. The system of claim 1 wherein the hazard logic is configured to not delay the transmission of the non-posted from the transaction group based on previously transmitted posted from the transaction group to different address ranges than an address range of the non-posted from the transaction group.

4. The system of claim 1 wherein the hazard logic is configured to not delay completion transactions between the first bridge and the second bridge.

5. The system of claim 1 wherein the first bridge comprises a buffer for buffering non-posted sent by the at least one PCI-ordered agent on the primary interface, to order behind posted requests transmitted earlier and not behind posted requests not transmitted earlier, whereby the buffer reduces negative effects on bandwidth and latency of the non-posted caused by concurrent posted sent by the at least one PCI-ordered agent on the primary interface.

6. The system of claim 5 wherein size of the buffer is based on the roundtrip time of posted and corresponding posted completion through the interconnect fabric.

7. The system of claim 1 wherein the first bridge comprises a buffer for buffering completion sent by the at least one PCI-ordered agent on the primary interface whereby the buffer reduces negative effects on bandwidth and latency of the completion caused by concurrent posted sent by the at least one PCI-ordered agent on the primary interface.

8. The system of claim 7 wherein size of the buffer is based on the roundtrip time of posted and corresponding posted completion through the interconnect fabric.

9. The system of claim 1 wherein the interconnect fabric transports posted, non-posted, completion and posted completion from the secondary transaction group on independent networks.

10. The system of claim 1 wherein the interconnect fabric transports posted and completion, which are selected from the transaction group and the secondary transaction group, respectively, on one network.

11. The system of claim 1 wherein the interconnect fabric transports posted and non-posted, which are selected from any one of the transaction group and the secondary transaction group, on the same network.

12. The system of claim 1 wherein the interconnect fabric transports completion and posted completion, which are selected from the secondary transaction group, on the same network.

13. The system of claim 1 further comprising a second PCI-ordered agent in communication with the second bridge.

14. The system of claim 1, wherein the fabric ordering is independent of ordering between posted and non-posted.

15. The system of claim 1, wherein the fabric ordering is independent of ordering between posted and completion.

16. The system of claim 1, wherein communication between the first bridge and the fabric uses three networks and the posted and the completion selected from the transaction group are carried on the same network.

17. The system of claim 1, wherein communication between the first bridge and the fabric uses two networks, wherein one network carries the posted and the non-posted while another network carries the completion and the posted completion.

18. A method of maintaining PCI ordering on an interconnect fabric, the method comprising steps of:
transmitting a posted completion transaction on the interconnected fabric as a response to receiving a posted transaction;
delaying the transmission of any one transaction selected from a transaction group based on the reception of the posted completion transaction;
checking for a new posted transaction;
checking for a prior posted transaction with dependency ordering; and
delaying a transmission of the new posted transaction until the prior posted transaction is sent and completed as indicated by the posted completion transaction,
wherein the transaction group includes a posted transaction, a non-posted transaction, and a completion transaction.

19. The method of claim 18 further comprising step of delaying the transmission of a new non-posted transaction based on a prior non-posted transaction with dependency ordering.

20. The method of claim 18 further comprising step of delaying the transmission of a new completion transaction based on a prior completion transaction with dependency ordering.

21. A computer system including a memory and a processor to execute a program that models PCI-ordered interconnect fabrics and provides a solution for creating PCI-ordered interconnect fabrics, the program comprising steps of:
providing a set of PCI-ordered protocols that are supported by the program;
providing for each PCI-ordered protocol a set of parameters that are supported by the program;
requesting a selection of at least one agent from a plurality of agents, to connect to an interconnect fabric;
requesting, for the at least one agent, a selection of a PCI-ordered protocol to connect to the agent, wherein the PCI-ordered protocol is selected from the set of PCI-ordered protocols that are supported by the program;
requesting, for the at least one agent, an input of a parameter, wherein the parameter is used to connect to the at least one agent, and wherein the parameter is selected, from the set of parameters supported by the program, for the PCI-ordered protocol selected; and
providing, for the agent, a bridge, wherein the bridge is enabled to connect to the agent using the PCI-ordered protocol selected for the at least one agent and the parameter inputted for the at least one agent, and wherein the bridge is enabled to convert the PCI-ordered protocol selected for the at least one agent with the parameters inputted for the at least one agent to a protocol suitable to be carried on independent networks in the interconnect fabric,
wherein the bridge is enabled to send a posted completion transaction as a response to receiving a posted transaction from the interconnect fabric, and
wherein the bridge is enabled to delay transactions received from the at least one agent based on the reception of a posted completion transaction from the interconnect fabric.

22. The computer system of claim 21, wherein the program further comprises step of:
providing a set of components that define the interconnect fabric,
wherein the step of requesting the selection of at least one agent comprises requesting input of an interconnection table between the at least one agent and at least one other agent.

23. The computer system of claim 22, wherein the program further comprises step of enabling the interconnect fabric to connect to the bridge and wherein a topology of the interconnect fabric supports the interconnection table.

24. The computer system of claim 21, wherein the program further comprises steps of:
providing a set of components that define the interconnect fabric;
requesting selection of at least two components from the set of components and respective connections to describe the interconnect fabric; and
providing the interconnect fabric enabled to connect to the bridge wherein a topology of the interconnect fabric matches a topology of the bridge.

25. The computer system of claim 21, wherein the program further comprises steps of:
providing a set of non-PCI-ordered protocols that are supported by the program;

providing a set of parameters for each non-PCI-ordered-protocol of the set of non-PCI-ordered protocols that are supported by the program;

requesting a selection of at least one new agent connected by the interconnect fabric through the non-PCI-ordered protocols of the set of non-PCI-ordered protocols that are supported by the program;

requesting, for the at least one new agent, a selection of one non-PCI-ordered protocol from the set of non-PCI-ordered protocols that are supported by the program, to be used to connect to the at least one new agent;

requesting for the at least one new agent an input of new parameters, to be used to connect to the at least one new agent, wherein the new parameters are supported by the program for the non-PCI-ordered protocol selected; and providing a second bridge for the at least one new agent, wherein the second bridge connects the at least one new agent to the interconnect fabric using the non-PCI-ordered protocol selected for the at least one new agent and the new parameters inputted for the at least one new agent, and wherein the second bridge converts the non-PCI-ordered protocol selected for the at least one new agent with the new parameters inputted for the at least one new agent to a suitable protocol that can be carried on the interconnect fabric.

26. An apparatus for maintaining PCI ordering on an interconnect fabric, comprising:

means for transmitting a posted completion transaction on the interconnected fabric as a response to receiving a posted transaction;

means for delaying the transmission of any one transaction selected from a transaction group based on the reception of the posted completion transaction;

means for checking for a new posted transaction;

means for checking for a prior posted transaction with dependency ordering; and means for delaying a transmission of the new posted transaction until the prior posted transaction is sent and completed as indicated by the posted completion transaction, wherein the transaction group includes a posted transaction, a non-posted transaction, and a completion transaction.

27. The apparatus of claim 26 further comprising:

means for delaying the transmission of a new non-posted transaction based on a prior non-posted transaction with dependency ordering.

28. The apparatus of claim 26 further comprising:

means for delaying the transmission of a new completion transaction based on a prior completion transaction with dependency ordering.

* * * * *